No. 620,698. Patented Mar. 7, 1899.
J. CHRISTY, Jr. & H. E. RANDALL.
COMBINED METAL AND RUBBER VEHICLE TIRE.
(Application filed Oct. 15, 1898.)
(No Model.)
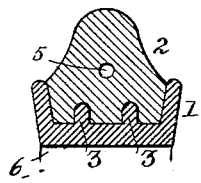
Witnesses:
Inventors:
James Christy, Jr.
Harry E. Randall;
by Humphrey & Humphrey
Attys.

UNITED STATES PATENT OFFICE.

JAMES CHRISTY, JR., OF AKRON, AND HARRY E. RANDALL, OF DAYTON, OHIO.

COMBINED METAL AND RUBBER VEHICLE-TIRE.

SPECIFICATION forming part of Letters Patent No. 620,698, dated March 7, 1899.

Application filed October 15, 1898. Serial No. 693,593. (No model.)

*To all whom it may concern:*

Be it known that we, JAMES CHRISTY, Jr., residing at Akron, in the county of Summit, and HARRY E. RANDALL, residing at Dayton, in the county of Montgomery, State of Ohio, citizens of the United States, have invented a certain new and useful Improvement in a Combined Metal and Rubber Vehicle-Tire, of which the following is a specification.

Our invention has relation to improvements in combined metal and rubber vehicle-tires, and has especial relation to that class in which the metal portion has a channel in its periphery with a flat bottom and slightly outwardly sloping sides. Objection has been found to these tires from the fact that the rubber portion, having nothing but the sloping sides to retain it, is liable to twist or turn in the iron portion from lateral strain.

The object of our invention is to overcome this objection by forming the bottom of the channel with alternate longitudinal and raised portions, practically producing channels and ridges.

To the aforesaid object our invention consists in certain peculiar and novel features of construction and also in certain combinations and arrangements of parts hereinafter described and then specifically pointed out in the claim, reference being had to the accompanying drawing, forming a part of this specification.

In the drawing, 1 is a metallic tire adapted to fit on the felly 6 and having side flanges slightly outwardly inclined, thus forming a longitudinal channel with a flat bottom. In this bottom and integral with the tire are longitudinal ridges 3 3 of less height than the sides of the tire and having their edges preferably rounded.

The tire 2 is of solid vulcanized rubber, having its inner face conformed to fit the channel in the metallic tire, with channels to receive the ridges 3, and having the outer face raised to project above the flanges of the metal tire, and rounded. Running lengthwise through the tire is a wire 5, the ends of which are united when the tire is completed, located centrally between and above the ridges 3 3, thus exerting its tension between the ridges and tending to prevent the escape of the rubber tire.

We do not wish to confine our invention to the exact form shown or to the number of channels and ridges, as these may be changed as the requirements of the vehicle may require; but

What we claim, and desire to secure by Letters Patent, is—

An improved tire for vehicles consisting of a metallic tire having a longitudinal channel in its outer periphery, with a flat bottom and slightly outwardly inclined sides, longitudinal ridges in the bottom of said tire, a solid rubber tire adapted to fit said channel having grooves therein to receive said ridges, in combination with a single wire embedded substantially centrally in said rubber tire midway between and slightly above said ridges, substantially as shown and described.

In testimony that we claim the above we hereunto set our hands.

JAMES CHRISTY, JR.
HARRY E. RANDALL.

In presence of—
H. V. SMITH,
D. J. SMITH.